US012169050B1

(12) United States Patent
Kim et al.

(10) Patent No.: US 12,169,050 B1
(45) Date of Patent: Dec. 17, 2024

(54) OPTICAL APPARATUS FOR A MOBILITY VEHICLE

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Hyeong Seon Kim, Anyang-si (KR); Young Geun Jun, Seoul (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/517,528

(22) Filed: Nov. 22, 2023

(30) Foreign Application Priority Data

Jun. 19, 2023 (KR) ........................ 10-2023-0078461

(51) Int. Cl.

| | |
|---|---|
| ***F21V 14/02*** | (2006.01) |
| ***F21S 41/141*** | (2018.01) |
| ***F21S 41/20*** | (2018.01) |
| ***F21V 5/04*** | (2006.01) |
| *F21Y 115/10* | (2016.01) |

(52) U.S. Cl.
CPC ........... *F21S 41/285* (2018.01); *F21S 41/141* (2018.01); *F21V 5/04* (2013.01); *F21Y 2115/10* (2016.08)

(58) Field of Classification Search
CPC ......... F21S 41/285; F21S 41/141; F21V 5/04; F21Y 2115/10
See application file for complete search history.

(56) References Cited

U.S. PATENT DOCUMENTS

| | | | | |
|---|---|---|---|---|
| 11,204,147 | B1 * | 12/2021 | Park | F21S 41/43 |
| 2019/0361395 | A1 * | 11/2019 | Kurashige | F21V 14/06 |
| 2022/0397745 | A1 * | 12/2022 | Chiang | F21S 41/141 |

FOREIGN PATENT DOCUMENTS

| | | |
|---|---|---|
| KR | 20130048540 A | 5/2013 |

* cited by examiner

*Primary Examiner* — Elmito Breval
(74) *Attorney, Agent, or Firm* — Lempia Summerfield Katz LLC

(57) ABSTRACT

An optical apparatus for a mobility vehicle reduces the overall size of an optical system of the mobility vehicle by implementing a favorable package configuration, ensures sufficient lighting and high luminous efficiency through the efficient operation of a light source, and improves the quality of the lighting image projected onto an illumination area.

12 Claims, 12 Drawing Sheets

OPTICAL APPARATUS FOR A MOBILITY VEHICLE

CROSS REFERENCE TO RELATED APPLICATION

The present application claims the benefit of and priority to Korean Patent Application No. 10-2023-0078461, filed on Jun. 19, 2023, the entire contents of which are hereby incorporated herein by reference.

BACKGROUND

Technical Field

The present disclosure relates to an optical apparatus for a mobility vehicle that ensures high luminous efficiency and reduces the size of the optical system of the mobility vehicle.

Description of the Related Art

A mobility vehicle is generally provided with a lighting device to ensure the driver's visibility in the driving direction and signal driving status during nighttime driving.

The lighting device may be classified by the direction of illumination or by the light function purpose, e.g., headlights, fog lights, turn signal lights, brake lights, reverse lights, and the like.

The headlights may be configured to emit low beams in normal driving situations and high beams in special situations.

On the other hand, the optical system for a future mobility vehicle tends to be smaller in overall size. When the optical system is slimmed down, a failure to meet luminance requirements may lead to issues of non-compliance with regulations and problems in ensuring forward visibility.

The matters described above as background technology are intended to provide a better understanding of the background of the present disclosure and should not be considered as acknowledging that the present disclosure pertains to the prior art already known to those of ordinary skill in the art.

SUMMARY

Embodiments of the present disclosure provide ways to enhance marketability through advanced lamp design by slimming down the optical system, complying with regulations by providing sufficient lighting, and ensuring peripheral visibility by providing ample lighting.

An aspect of the present disclosure provides an optical apparatus for a mobility vehicle, i.e., a vehicle, that reduces the overall size of the optical system of the mobility vehicle by implementing a favorable package configuration, ensures sufficient lighting and high luminous efficiency through efficient operation of the light source, and improves the quality of a lighting image projected onto an illumination area.

According to an embodiment of the present disclosure, an optical apparatus for a mobility vehicle may include a plurality of light sources that emit a light. The optical apparatus further includes a first lens of a plurality of first lenses that matches a light source of the plurality of light sources. The first lens has a convex or concave vertical cross-section. The optical apparatus further includes a second lens of a plurality of second lenses. The second lens matches the first lens and receives the light transmitted through the first lens. The second lens has a convex or concave horizontal cross-section. The optical apparatus further includes a third lens of a plurality of third lenses that receives the light transmitted through the second lens and has a transmissive portion that matches the second lens. A plurality of cells are arranged on an exit surface of the transmissive portion.

An illumination area may be set for each matching light source, the first lens, and the second lens.

The first lens may have a quadrangular horizontal cross-section.

The second lens may have a convex or concave horizontal cross-section and a quadrangular vertical cross-section.

A distance between the first lens and second lens matching each other and a distance between the second lens and the transmissive portion of the third lens matching the second lens may be uniform.

A distance from the second lens to the light source may increase as a radius of curvature decreases and decrease as the radius of curvature increases, due to the convexity or concavity of the horizontal cross-section of the second lens.

The transmissive portion of the third lens may have aspherical incident surfaces and uniform radius of curvature.

The plurality of light sources may be matched to the plurality of first lenses to form a plurality of light modules. Different illumination areas are set for each respective plurality of light modules.

The plurality of light modules may be transversely arranged. The plurality of second lenses may be transversely arranged to match the respective plurality of light modules. The plurality of third lenses may transversely extend such that each respective transmissive portion is transversely spaced apart to match the plurality of second lenses.

Each light module of the plurality of light modules may include a condensing light module and a diffusing light module. The condensing light module may form a beam pattern on the transverse center line of the illumination area. The diffusing light module may form a diffused beam pattern on the transverse center line of the illumination area.

The first lens of the condensing light module may be longitudinally smaller than the first lens of the diffusing light module.

The respective plurality of light sources of the condensing light module and the diffusing light module may be disposed at the center of the respective plurality of first lenses so that the light source of the condensing light module is positioned lower than the light source of the diffusing light module.

The exit surface of the first lens of the condensing light module may have a smaller radius of curvature than the exit surface of the first lens of the diffusing light module.

The optical apparatus for a mobility vehicle having the structure described above reduces the overall size of the optical system of the mobility vehicle by implementing a favorable package configuration, ensures sufficient lighting and high luminous efficiency through efficient operation of the light source, and improves the quality of the lighting image projected onto the illumination area.

DETAILED DESCRIPTION

Figure 1:
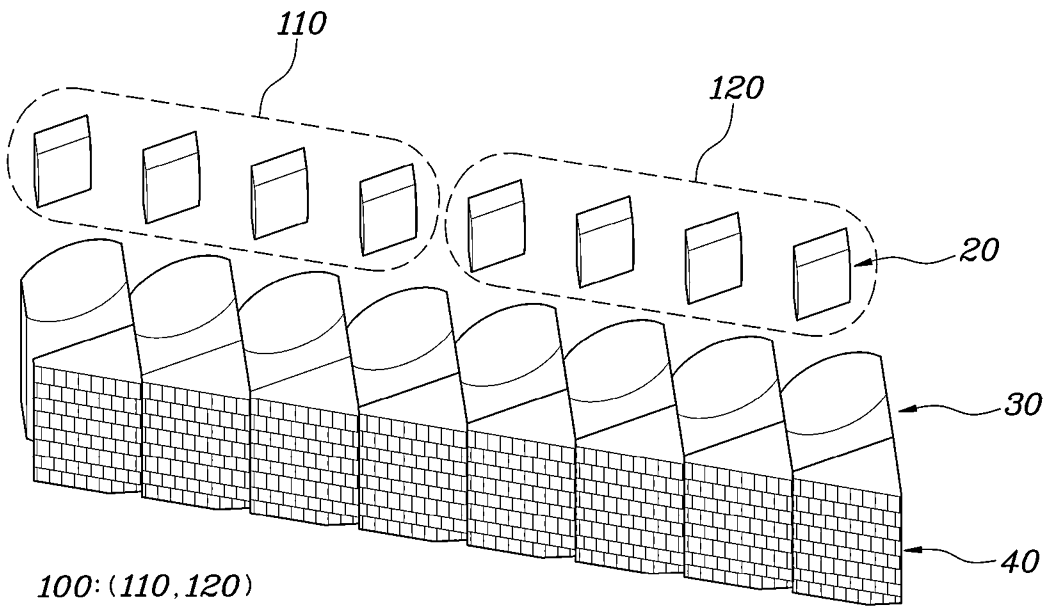
FIG. 1 is a view illustrating an optical apparatus for a mobility vehicle according to an embodiment of the present disclosure.

The embodiments disclosed herein are described in detail with reference to the accompanying drawings. However, the same or similar components are given the same reference numerals regardless of the drawing numbers, and the repetitive descriptions regarding these components are omitted.

The suffixes "module" and "unit" for the components used in the description are given or interchangeably used only to facilitate the writing of the specification, without necessarily indicating a distinct meaning or role of their own.

When it is determined that the specific description of the related and already known technology may obscure the essence of the embodiments disclosed herein, the specific description is omitted. Further, it is to be understood that the accompanying drawings are only intended to facilitate understanding of the embodiments disclosed herein and are not intended to limit the technical ideas disclosed. The embodiments herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the other component, but other components may be interposed therebetween. In contrast, it is to be understood that when a component is referred to as being "directly connected" or "directly coupled" to another component, no other component is interposed.

When a component, device, element, or the like of the present disclosure is described as having a purpose or performing an operation, function, or the like, the component, device, or element should be considered herein as being "configured to" meet that purpose or perform that operation or function.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts, or combinations thereof.

A controller may include a communication device that communicates with other controllers or sensors to control the functions for which the controller is responsible, a memory that stores an operating system or logic instructions and input and output information, and one or more processors that perform determinations, calculations, decisions, and the like necessary for controlling the functions for which the controller is responsible.

An optical apparatus for a mobility vehicle according to an embodiment of the present disclosure is described with reference to the accompanying drawings below.

Figure 2:
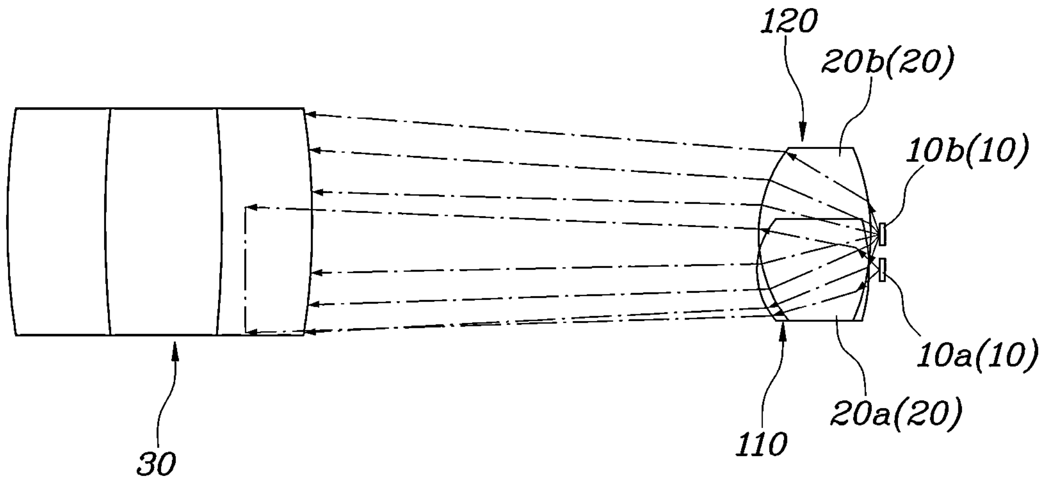
FIG. 2 is a side view of the optical apparatus for a mobility vehicle illustrated in FIG. 1.
Figure 3:
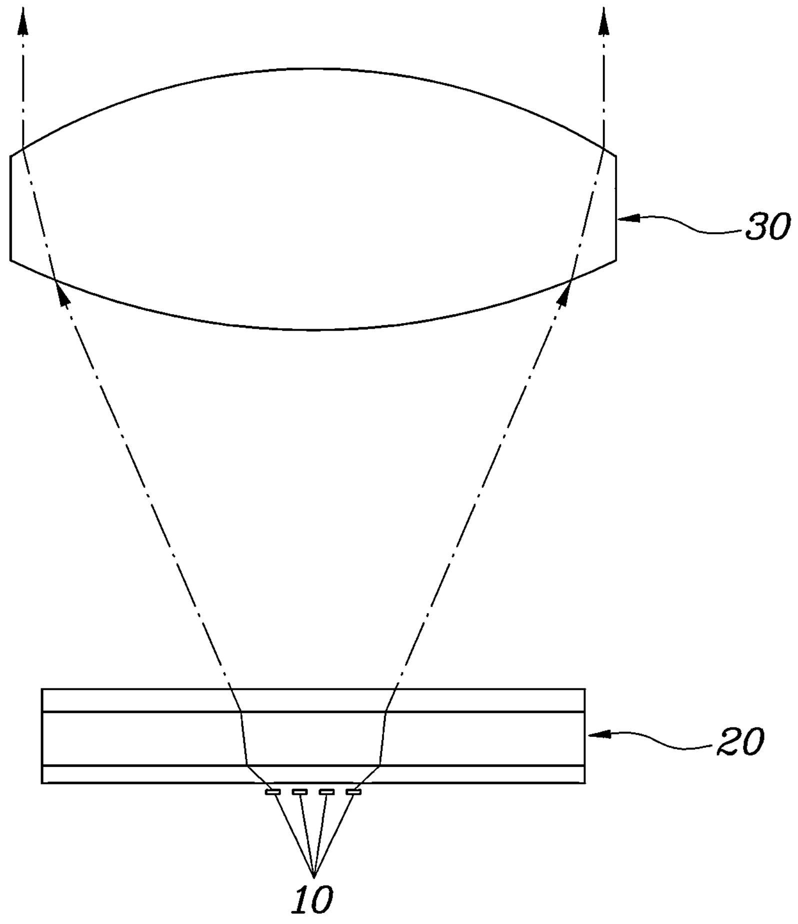
FIG. 3 is a plan view of the optical apparatus for a mobility vehicle illustrated in FIG. 1.

According to an embodiment of the present disclosure, an optical apparatus for a mobility vehicle includes a plurality of light sources 10 that emit a light. The optical apparatus further includes a first lens 20 that matches a light source from the plurality of light sources 10. The first lens 20 has a convex or concave vertical cross-section. The optical apparatus further includes a second lens 30 that receives the light transmitted through the first lens 20. The second lens 30 has a convex or concave horizontal cross-section. The optical apparatus further includes a third lens 40 that receives the light transmitted through the second lens 30. The third lens 40 has a transmissive portion 41 that matches the second lens 30. A plurality of cells 42 are arranged on an exit surface of the transmissive portions The present disclosure includes a plurality of light sources 10 (shown in FIG. 2), first lenses 20, second lenses 30, and third lenses 40. The present disclosure ensures advanced lamp design through slimming-down of the lenses.

Each light source of the plurality of light sources 10 may include LEDs. The light source 10 may be separately turned on and off and operated to create various beam patterns. The light source 10 may be turned on and off by the control of a controller, which transmits control signals to the light source 10 upon receiving external signals.

The first lens of the plurality of first lenses 20 matches, i.e., is associated with, a particular light source of the plurality of light sources 10, i.e., a light source, a corresponding light source, a first light source, or a first light source unit. The first lens 20 is disposed in front of the corresponding light source 10 to receive a light, i.e., a light ray, emitted from the light source 10. The first lens 20 is configured to control the vertical orientation angle and may have a convex or concave vertical cross-section. In other words, the light emitted from the light source 10 passes through the first lens 20 and moves with a vertical orientation angle to be incident on a specific range of the second lens 30.

The second lens 30 receives the light transmitted through the first lens 20 and matches the first lens 20. The second lens 30 is configured to control a horizontal orientation angle and may have a convex or concave horizontal cross-section. In other words, the light transmitted through the first lens 20 passes through the second lens 30 and moves with a horizontal orientation angle to be incident on each transmissive portion 41 of the third lens 40.

The distribution of light emitted from the light source 10 is determined by the vertical orientation angle control of the first lens 20 and the horizontal orientation angle control of the second lens 30. Therefore, the light incident on the transmissive portion 41 of the third lens 40 may be projected as collimated light through a plurality of cells 42.

According to an embodiment of the present disclosure, a beam pattern is formed as the vertical orientation angle and horizontal orientation angle of the light emitted from the light source 10 are adjusted by the first lens 20 and the second lens 30, and the light is projected through the third lens 40. In particular, the positions, sizes, curved surface shapes, and tilting angles of the first lens 20 and the second lens 30 determine the orientation angle, the amount of light overlap, and luminous intensity such that various beam patterns may be implemented by optimizing the shapes and disposition of the first lens 20 and the second lens 30.

Figure 4:
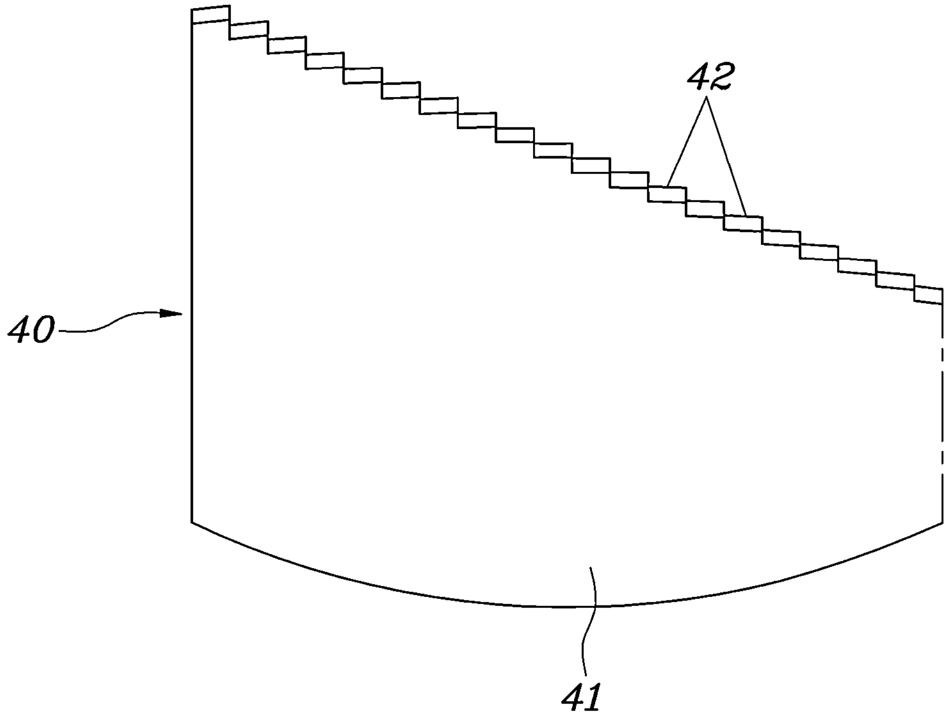
FIG. 4 is a cross-sectional view of a third lens according to an embodiment of the present disclosure.
Figure 5:
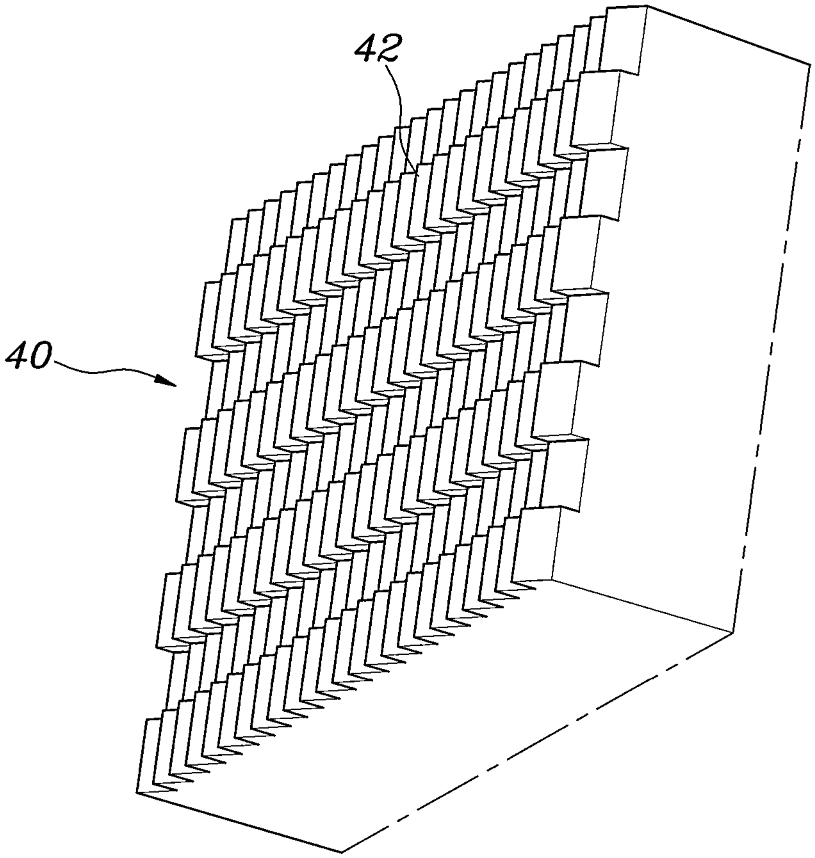
FIG. 5 is a view illustrating an exit surface of a third lens according to an embodiment of the present disclosure.

In addition, as illustrated in FIGS. 4 and 5, the third lens 40 has an aspherical incident surface. A plurality of cells 42 are arranged on the exit surface so that the light may be aligned when passing through the aspherical lens and then be projected as collimated light through the plurality of cells 42. The plurality of cells 42 may be arranged on the exit surface of the third lens 40 longitudinally or transversely so that the light may be projected forward as collimated light.

The transmissive portion 41 of the third lens 40 has an aspherical incident surface but the light may be projected as collimated light or condensed light by adjusting the radius of curvature, and the design may be based on the desired beam pattern ultimately projected.

The first lens 20, the second lens 30, and the third lens 40 may respectively include a plurality of lenses. In particular, a plurality of lenses may be integrated into each of the first, second, and third lenses, or the lenses may be integrated into one altogether.

Specifically, as illustrated in FIG. 1, a plurality of light sources 10 may be provided for each first lens 20, and an illumination area may respectively be set for each light source 10, first lens 20, and second lens 30 matching each other.

According to an embodiment of the present disclosure, a plurality of light sources 10 are provided, the plurality of light sources 10 are divided for each first lens 20, and different areas are illuminated through the first lens 20 matching the divided light source 10 and the second lens 30 so that a beam pattern is formed.

In other words, as illustrated in FIG. 1, the first lens 20, the second lens 30, and the transmissive portion 41 of the third lens 40 are laterally arranged to match each other in the front-to-rear direction. A plurality of light sources 10 are provided in the rear of the respective first lenses 20 so that beam patterns may be formed at different positions by the light emitted from the respective light sources 10. The beam patterns may be changed by adjusting the lighting status of the respective light sources 10 according to various situations.

On the other hand, the first lens 20 may have a convex vertical cross-section and a quadrangular horizontal cross-section.

Therefore, the vertical cross-sections of the incident surface and exit surface of the first lens 20 are formed in a convex shape so that the vertical orientation angle of the light emitted from the light source 10 is adjusted. The vertical orientation angle may be adjusted according to the radius of curvature of the incident surface and the radius of curvature of the exit surface of the first lens 20. The shape of the first lens 20 may determine the area of light incident on the second lens 30. The vertical orientation angle refers to the angle formed between the light ray emitted from the light source 10 and the light axis on the vertical line. The shape of the first lens 20 determines the longitudinal area of light incident on the second lens 30.

In addition, the horizontal cross-section of the first lens 20 is formed in a quadrangular shape so that the vertical orientation angle of light emitted from the light source 10 is not adjusted.

On the other hand, in the second lens 30, the horizontal cross-section may be formed in a convex or concave shape and the horizontal cross-section may be formed in a quadrangular shape.

Therefore, the horizontal cross-sections of the incident surface and exit surface of the second lens 30 are formed in a convex shape so that the horizontal orientation angle of light emitted from the light source 10 is adjusted. The horizontal orientation angle may be adjusted according to the radius of curvature of the incident surface and the radius of curvature of the exit surface of the second lens 30. The shape of the second lens 30 may determine the area of light incident on the third lens 40. The horizontal orientation angle refers to the angle formed between the light ray emitted from the light source 10 and the light axis on the horizontal line. The shape of the second lens 30 determines the transverse area of light incident on the third lens 40.

In addition, the vertical cross-section of the second lens 30 is formed in a quadrangular shape so that the vertical orientation angle of light emitted from the light source 10 is not adjusted.

As a result, the first lens 20 controls the vertical orientation angle and the second lens 30 controls the horizontal orientation angle such that the light is incident on the respective transmissive portions 41 of the third lens 40 overall so that sharp beam patterns may be formed as the light passes through the third lens 40.

Figure 6:
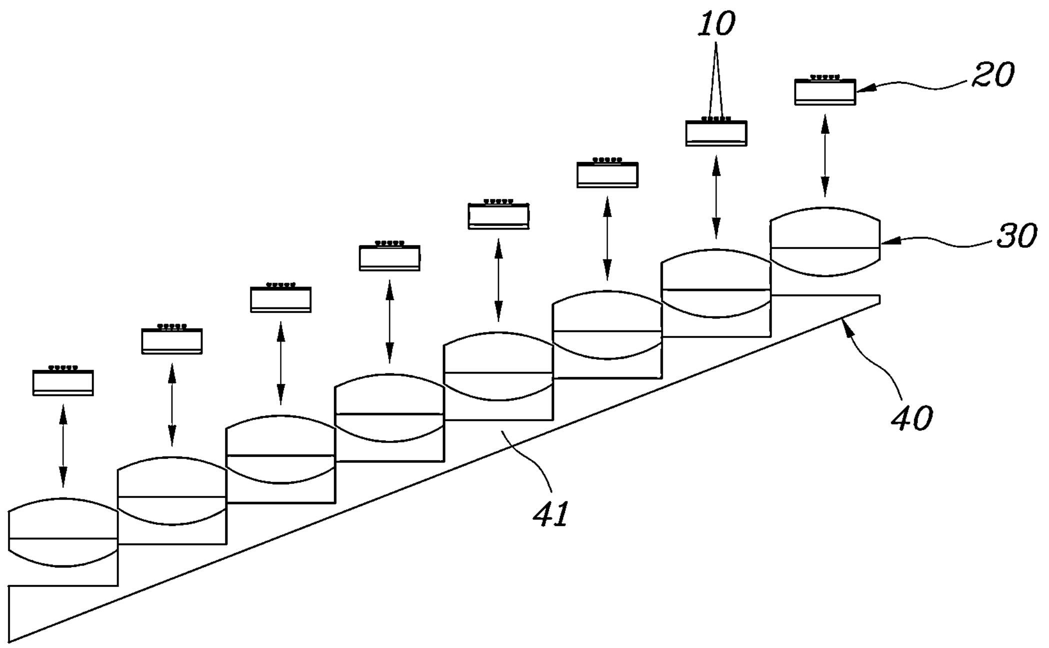
FIG. 6 is a view illustrating an optical apparatus for a mobility vehicle according to an embodiment of the present disclosure.

On the other hand, as illustrated in FIG. 6, the distance between the first lens 20 and the second lens 30 matching each other and the distance between the second lens 30 and the transmissive portion 41 of the third lens 40 matching the second lens 30 may be uniform.

According to an embodiment, the incident surface and the exit surface of the first lens 20 may have a uniform radius of curvature. The incident surface and the exit surface of the second lens 30 may have a uniform radius of curvature, and the transmissive portions 41 of the third lens 40 may have a uniform aspherical curvature. Accordingly, the first lens 20 and the second lens 30 matching each other are disposed at a uniform distance and the second lens 30 and the transmissive portion 41 of the third lens 40 matching the second lens 30 are disposed at a uniform distance so that a uniform beam pattern may be formed when the light emitted from the respective light sources 10 passes through the lenses and form a beam pattern.

In addition, even when the third lens 40 diagonally extends, the first lens 20 and the second lens 30 are diagonally arranged according to the shape of the third lens 40 such that the distance between the respective lenses is uniform so that the light emitted from the respective plurality of light sources 10 may form a uniform beam pattern.

On the other hand, the distance from the second lens to the respective light source 10 unit increases as the radius of curvature decreases and decreases as the radius of curvature increases, due to the convexity or concavity of the horizontal cross-section of the second lens 30.

The second lens 30 is to be placed between the first lens 20 and the third lens 40 such that the light transmitted through the first lens 20 is incident on the same area of the third lens 40. The position of the second lens 30 may change according to the shape of the second lens 30.

Figure 7:
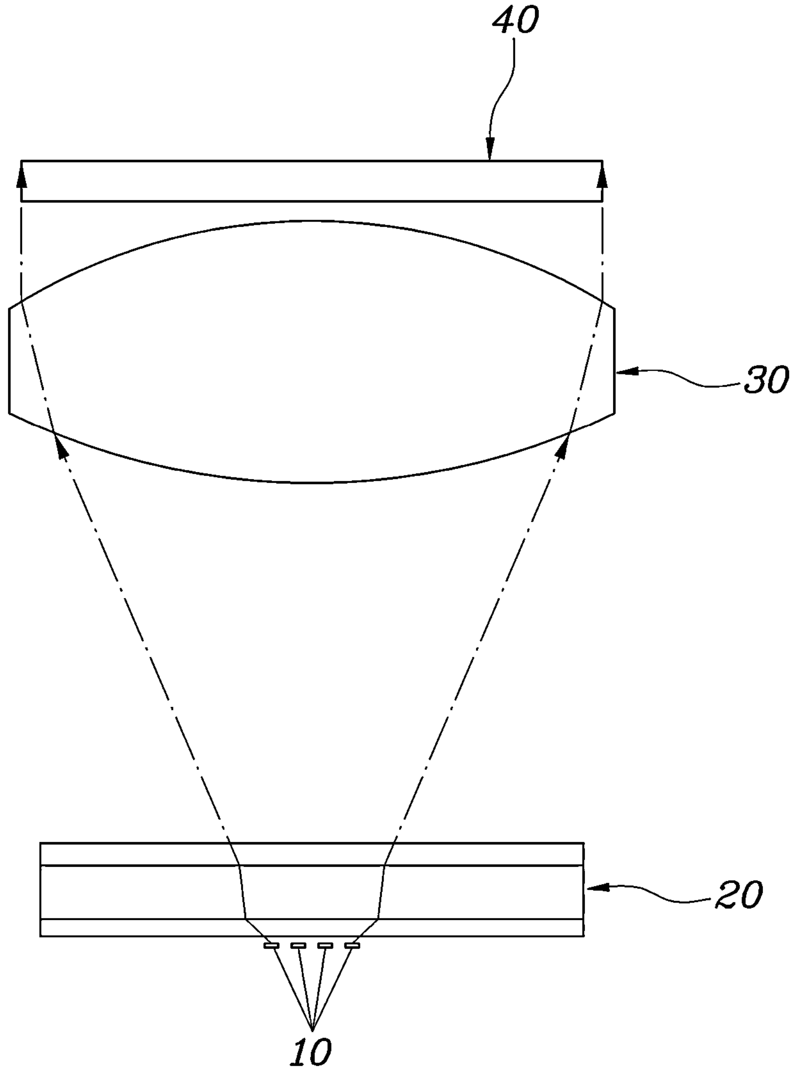
FIG. 7 is a view for describing a disposition according to the shape of the second lens in an optical apparatus for a mobility vehicle according to an embodiment of the present disclosure.

For example, as illustrated in FIG. 7, when the horizontal cross-section of the second lens 30 is formed in a convex shape and the radius of curvature decreases by the convexity of the second lens 30, the refraction angle of the light transmitted through the first lens 20 to be incident thereon increases. As a result, the second lens 30 may be disposed close to the third lens 40 by increasing the distance from the first light source 10.

Figure 8:
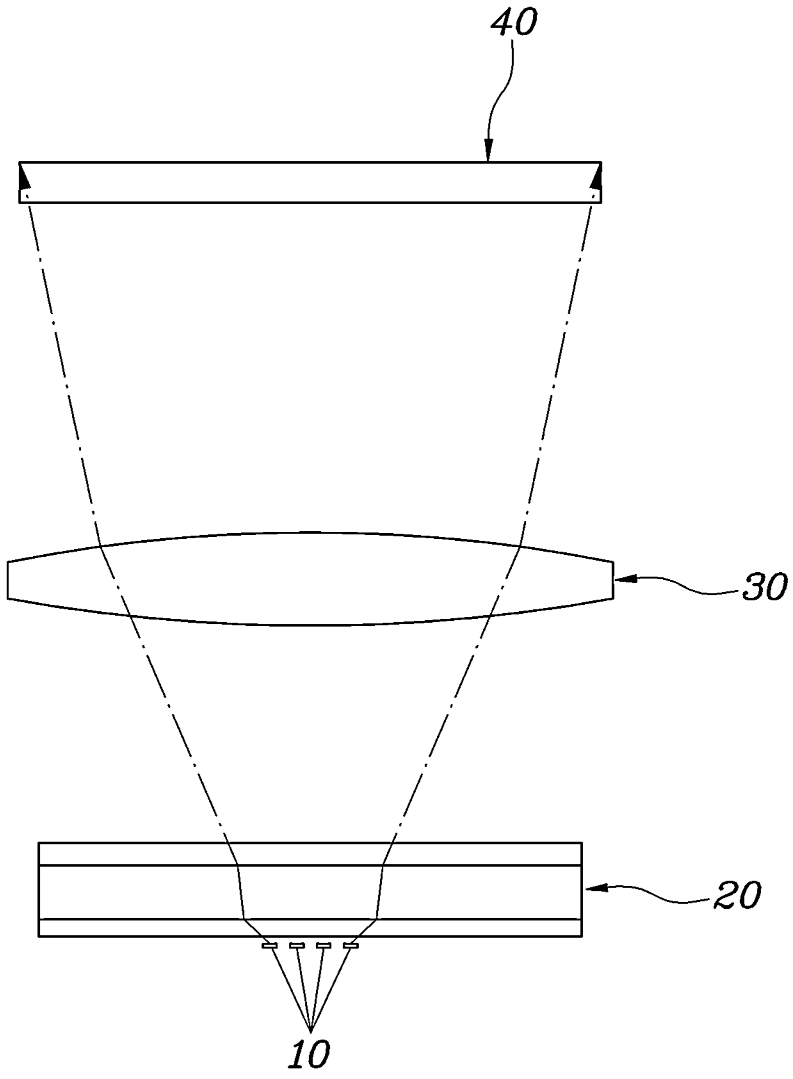
FIG. 8 is a view for describing a disposition according to the shape of the second lens in an optical apparatus for a mobility vehicle according to an embodiment of the present disclosure.

In addition, as illustrated in FIG. 8, when the radius of curvature of the horizontal cross-section increases by the convexity of the second lens 30, the refraction angle of the light transmitted through the first lens 20 to be incident thereon decreases. As a result, the second lens 30 may be disposed away from the third lens 40 by decreasing the distance from the first light source 10.

According to an embodiment of the present disclosure, the position of the second lens 30 may be adjusted according to the radius of curvature of the incident surface and the exit surface of the second lens 30 so that freedom in the installation of the first lens 20, the second lens 30, and the third lens 40 is ensured.

On the other hand, as illustrated in FIGS. 4 and 5, the transmissive portion 41 of the third lens 40 may have an aspherical incident surface, and the radius of curvature of the transmissive portion 41 may be uniform.

The third lens 40 has an aspherical incident surface so that light may be projected onto a place where a beam pattern is to be formed, and light may be projected as a collimated light through a plurality of cells 42 formed on the exit surface.

In addition, the radius of curvature of the aspherical surface of the transmissive portion 41 of the third lens 40 is uniform so that the third lens may be disposed at a uniform distance from the second lens 30 matching the transmissive portion 41. In addition, when the light transmitted through the second lens 30 to be incident on the transmissive portion 41 is incident on the same area of the transmissive portion 41, a uniform beam pattern may be projected through the transmissive portion 41.

On the other hand, according to an embodiment of the present disclosure, a plurality of light sources 10 may be matched to the plurality of first lenses 20 to form light modules, and different illumination areas may be set for respective light modules.

As illustrated in FIG. 1, a portion of the plurality of light sources 10 and the first lenses 20 matching the portion of the light sources respectively form a plurality of light modules. The respective plurality of light modules are laterally arranged. In addition, the plurality of second lenses 30 are matched to the respective plurality of light modules and the transmissive portions 41 of the third lens 40 are matched to the plurality of second lenses 30.

In particular, the respective plurality of light modules include a plurality of light sources 10 and each light source 10 is separately turned on and off so that various beam patterns may be formed according to the lighting status of each light source 10. For example, a full high beam may be formed when all the plurality of light sources 10 in the respective light modules are turned on. The diversification of beam patterns by separately turning on and off the respective light sources 10 according to the surrounding road environment, vehicle speed, presence or absence of obstacles allows implementation of various lighting functions such as communication functions, formation of beam shades and low beam patterns, and the like.

Different illumination areas may be set for the respective plurality of light modules in this manner, and beam patterns may be diversified by selectively turning on and off the respective plurality of light sources 10.

Specifically, the plurality of light modules may be transversally arranged, the second lenses 30 may be transversely arranged to match the respective light modules, and the third lens 40 may transversely extend such that the transmissive portions 41 are transversely spaced apart to match the second lenses 30.

The third lens 40 takes on a transversely extending shape according to the transverse arrangement of the plurality of light modules and the second lens 30 so that a lamp design that slims down and extends transversely may be implemented.

As a result, the light emitted from the respective light modules may form individual beam patterns, and some of the beam patterns formed by the respective light modules may overlap while others may be spaced apart to be projected onto the illumination area.

The plurality of light modules 100 may include a condensing light module 110 and a diffusing light module 120.

The condensing light module 110 may form a beam pattern in which light converges on the transverse center line in the illumination area, while the diffusing light module 120 may form a beam pattern in which light is diffused from the transverse center line in the illumination area.

In other words, the condensing light module 110 forms a beam pattern on the transverse center line in the illumination area so that the beam pattern is formed in a hot zone area of the illumination area.

In addition, the diffusing light module 120 forms a beam pattern longitudinally diffusing from the transverse center line in the illumination area in contrast to the beam pattern formed by the condensing light module 110.

As a result, the beam pattern formed by the condensing light module 110 projects light onto the hot zone in the illumination area so that sufficient lighting may be ensured. The diffusing light module 120 forms a beam pattern in the overall illumination area so that visibility is ensured.

Figure 9:
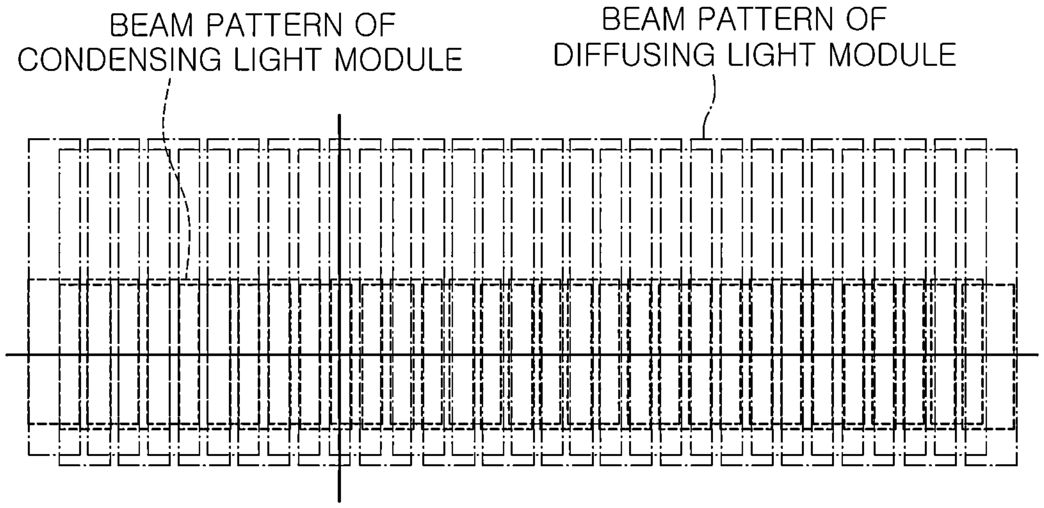
FIG. 9 is a view illustrating a beam pattern of an optical apparatus for a mobility vehicle according to an embodiment of the present disclosure.

In other words, as illustrated in FIG. 9, the beam pattern formed by the condensing light module 110 is projected onto a hot zone on the transverse center line in the illumination area. The beam pattern formed by the diffusing light module 120 is projected onto the overall illumination area so that sufficient lighting may be ensured, and the visibility of the beam pattern projected onto the illumination area may be ensured.

Figure 10:
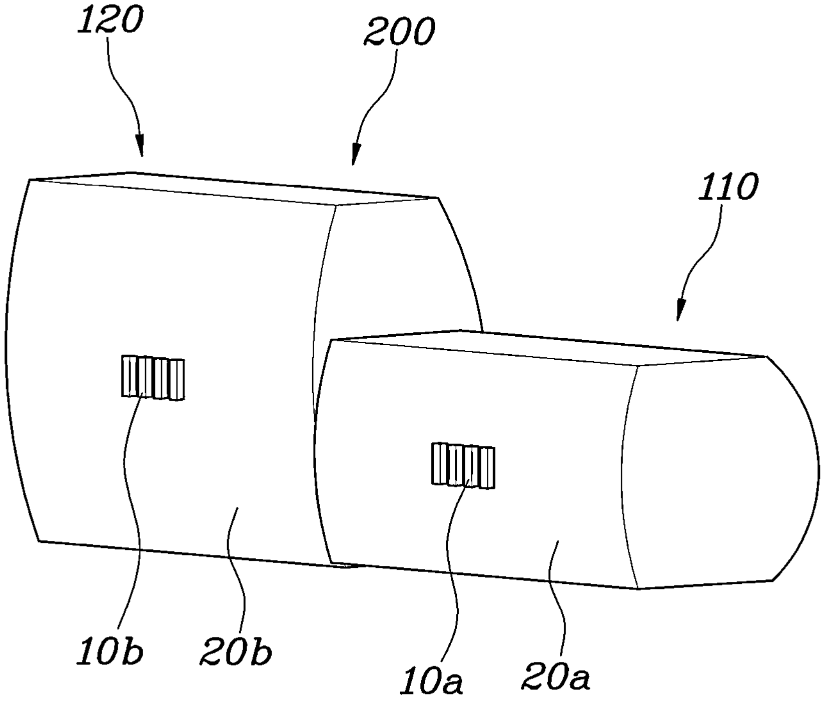
FIG. 10 is a view illustrating light sources and first lenses according to an embodiment of the present disclosure.
Figure 11:
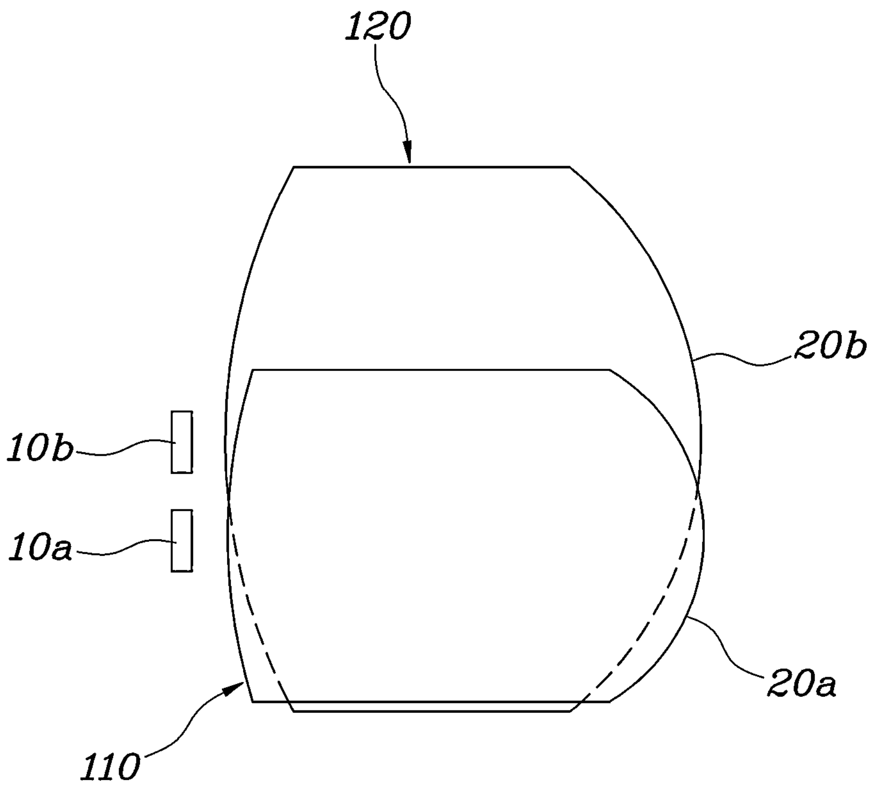
FIG. 11 is a side view of light sources and first lenses according to an embodiment of the present disclosure.

To this end, as illustrated in FIGS. 10 and 11, the first lens **20*a* of the condensing light module 110 may be longitudinally smaller than the first lens 20*b* of the diffusing light module 120**.

In addition, the light sources **10*a* and 10*b* are respectively disposed at the center of respective first lenses 20*a* and 20*b* in the condensing light module 110 and the diffusing light module 120 so that the light source 10*a* of the condensing light module 110 may be positioned lower than the light source 10*b* of the diffusing light module 120**.

The condensing light module 110 projects light onto a hot zone of the illumination area, and the light emitted from the light source **10*a* of the condensing light module 110 may pass through the first lens 20*a* to be incident on the lower portion of the second lens 30. Accordingly, the condensing light module 110 is positioned to match the lower portion of the second lens 30, and the first lens 20***a* of the condensing light module 110 is smaller than the first lens 20*b* of the diffusing light module 120 so that the light transmitted through the first lens 20*a* may be incident on the lower portion of the second lens 30. In addition, the light source 10*a* of the condensing light module 110 is disposed at the center of the first lens 20*a* so that when the light emitted from the light source 10*a* of the condensing light module 110 passes through the first lens 20*a*, the vertical orientation angle of the first lens 20*a* is controlled and the light may be incident on the lower portion of the second lens 30. Accordingly, when the light emitted from the condensing light module 110 passes through the second lens 30, the horizontal orientation angle is controlled and the light is incident on the lower portion of the third lens 40 so that a beam pattern may be formed on the transverse center line which serves as a hot zone in the illumination area.

The diffusing light module 120 projects light onto the entire illumination area. When the light emitted from the light source 10*b* of the diffusing light module 120 passes through the first lens 20*b* to be incident on the second lens 30, the light is incident on the entire second lens 30. Accordingly, the diffusing light module 120 is positioned to match the entire second lens 30 and is larger compared to the condensing light module 110 so that the light transmitted through the first lens 20*b* may be incident on the entire second lens 30.

In addition, the light source 10*b* of the diffusing light module 120 is disposed at the center of the first lens 20*b* so that when the light emitted from the light source 10*b* of the diffusing light module 120 passes through the first lens 20*b*, the vertical orientation angle of the first lens 20*b* is controlled and the light may be incident on the entire second lens 30. Accordingly, when the light emitted from the diffusing light module 120 passes through the second lens 30, the horizontal orientation angle is controlled and the light is incident on the entire third lens 40 so that a beam pattern diffusing from the transverse center line of the illumination area in the up and down direction may be formed.

In addition, the exit surface of the first lens 20*a* of the condensing light module 110 has a smaller radius of curvature than the exit surface of the first lens 20*b* of the diffusing light module 120 so that the refraction amount of the light passing through the first lens 20*a* of the condensing light module 110 may increase to condense the light in the hot zone of the illumination area.

According to an embodiment of the present disclosure, a beam pattern may be formed in the illumination area through each light module.

For example, FIG. 1 shows that the condensing light module 110 and the diffusing light module 120 are laterally arranged. Assuming that each light module is provided with four light sources 10, the condensing light module 110 and the diffusing light module 120 form partially overlapping beam patterns in or around the hot zone for each illumination area.

Figure 12:
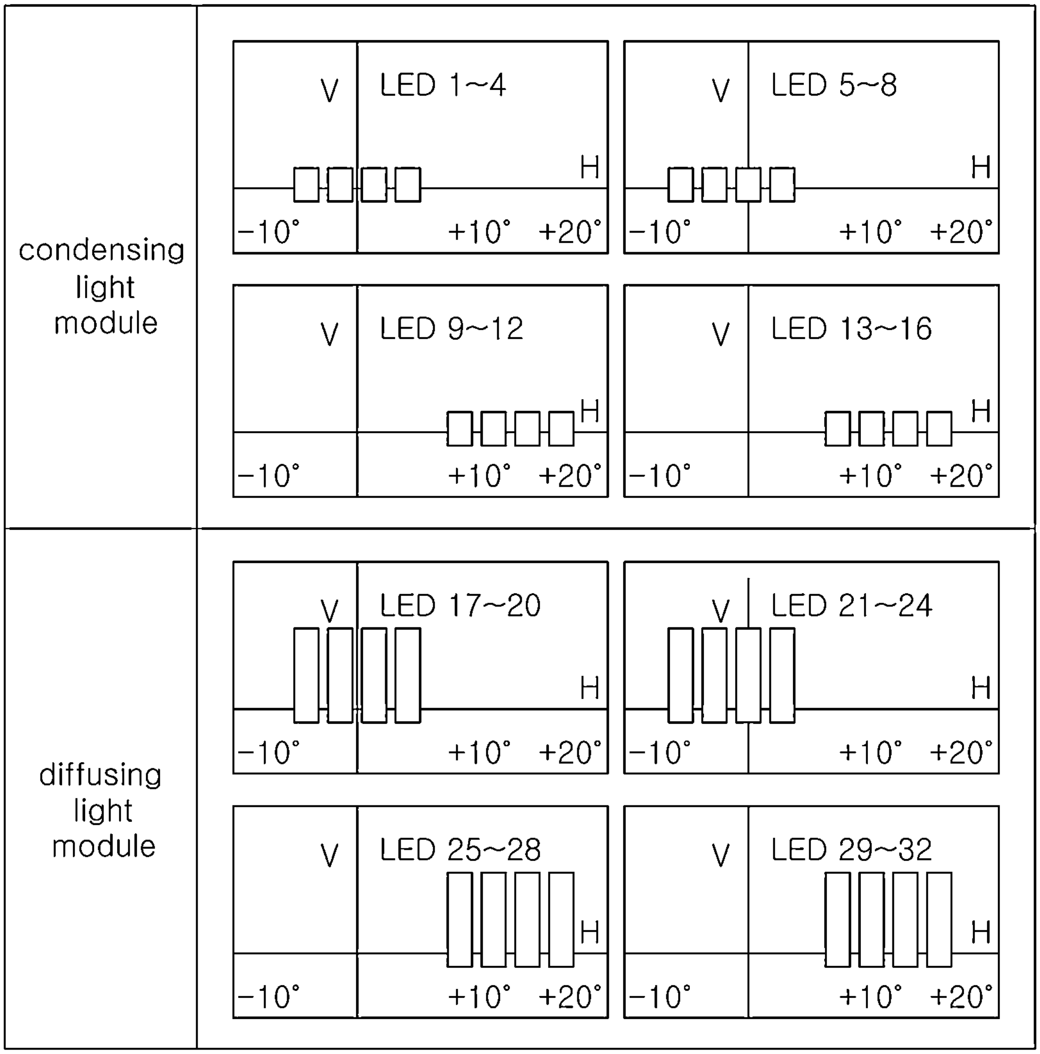
FIG. 12 is a view illustrating beam patterns of a condensing light module and a diffusing light module according to an embodiment of the present disclosure.

Accordingly, as illustrated in FIG. 12, the condensing light module 110 and the diffusing light module 120 may form their own beam patterns for the illumination area and beam patterns may be projected onto the hot zone area and the entire area by combining the beam patterns of the respective plurality of light modules, as illustrated in FIG. 9.

As a result, according to an embodiment of the present disclosure, sufficient lighting is ensured for the hot zone area, which is the center portion of the illumination area and beam patterns may be implemented in the entire illumination area so that uniform light may be projected onto the target illumination area.

The optical apparatus for a mobility vehicle having the structure described herein reduces the overall size of the optical system of the mobility vehicle by implementing a favorable package configuration, ensures sufficient lighting and high luminous efficiency through efficient operation of the light source, and improves the quality of the lighting image projected onto the illumination area.

Specific embodiments of the present disclosure have been described in detail. However, it should be obvious to those of ordinary skill in the art that various modifications and amendments are possible within the scope of the technical spirit of the present disclosure and it is natural that such modifications and amendments belong to the accompanying claims.

What is claimed is:

1. An optical apparatus for a mobility vehicle, comprising:
- a plurality of light sources configured to emit a light;
- a first lens of a plurality of first lenses matching a light source of the plurality of light sources and having a convex or concave vertical cross-section;
- a second lens of a plurality of second lenses, the second lens matching the first lens, receiving the light transmitted through the first lens and having a convex or concave horizontal cross-section; and
- a third lens of a plurality of third lenses, the third lens receiving light transmitted through the second lens and having a transmissive portion matching the second lens, wherein a plurality of cells are arranged on an exit surface of the transmissive portion and wherein the transmissive portion of the third lens has aspherical incident surfaces and uniform radius of curvature.

2. The apparatus of claim 1, wherein an illumination area is set for each matching light source, the first lens, and the second lens.

3. The apparatus of claim 1, wherein the first lens has a quadrangular horizontal cross-section.

4. The apparatus of claim 1, wherein the second lens has a convex or concave horizontal cross-section and a quadrangular vertical cross-section.

5. The apparatus of claim 1, wherein a distance between the first lens and the second lens matching each other and a distance between the second lens and the transmissive portion of the third lens matching the second lens are uniform.

6. The apparatus of claim 1, wherein a distance from the second lens to the light source increases as a radius of curvature decreases and decreases as the radius of curvature increases, due to the convexity or concavity of the horizontal cross-section of the second lens.

7. The apparatus of claim 1,
- wherein the plurality of light sources are matched to the plurality of first lenses to form a plurality of light modules, and
- wherein different illumination areas are set for each respective plurality of light modules.

8. The apparatus of claim 7, wherein
- the plurality of light modules are transversely arranged,
- the plurality of second lenses are transversely arranged to match the respective plurality of light modules, and
- the plurality of third lenses transversely extend such that each respective transmissive portion is transversely spaced apart to match the plurality of second lenses.

9. The apparatus of claim 7, wherein each light module of the plurality of light modules includes a condensing light module and a diffusing light module, and wherein:

the condensing light module forms a beam pattern on a transverse center line of an illumination area, and the diffusing light module forms a beam pattern diffusing from the transverse center line of the illumination area.

10. The apparatus of claim 9, wherein the first lens of the condensing light module is longitudinally smaller than the first lens of the diffusing light module.

11. The apparatus of claim 10, wherein the respective plurality of light sources of the condensing light module and the diffusing light module are disposed at the center of the respective plurality of first lenses so that the light source of the condensing light module is positioned lower than the light source of the diffusing light module.

12. The apparatus of claim 9, wherein the exit surface of the first lens of the condensing light module has a smaller radius of curvature than the exit surface of the first lens of the diffusing light module.

* * * * *